US008542648B2

(12) United States Patent
Vujcic (10) Patent No.: US 8,542,648 B2
(45) Date of Patent: Sep. 24, 2013

(54) RANDOM ACCESS CHANNEL FREQUENCY DIVERSITY

(75) Inventor: Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 889 days.

(21) Appl. No.: 12/350,028

(22) Filed: Jan. 7, 2009

(65) Prior Publication Data

US 2009/0180436 A1 Jul. 16, 2009

Related U.S. Application Data

(60) Provisional application No. 61/021,302, filed on Jan. 15, 2008.

(51) Int. Cl.
*H04J 11/00* (2006.01)

(52) U.S. Cl.
USPC .......................................... 370/330

(58) Field of Classification Search
None
See application file for complete search history.

(56) References Cited

U.S. PATENT DOCUMENTS

| 2005/0271025 | A1 | 12/2005 | Guethaus et al. | |
|---|---|---|---|---|
| 2007/0064665 | A1* | 3/2007 | Zhang et al. | 370/343 |
| 2007/0206531 | A1 | 9/2007 | Pajukoski et al. | |
| 2007/0263579 | A1 | 11/2007 | Ozluturk | |
| 2010/0002573 | A1* | 1/2010 | Baldemair et al. | 370/210 |

FOREIGN PATENT DOCUMENTS

WO WO-2007/091810 A1 8/2007

* cited by examiner

*Primary Examiner* — Jae Y Lee
*Assistant Examiner* — Alan Lindenbaum
(74) *Attorney, Agent, or Firm* — Birch, Stewart, Kolasch & Birch, LLP

(57) ABSTRACT

The present invention provides a method of transmitting on a random access channel in a radio communication system. In a single time slot there are enabled at least two different radio frequencies for transmission on the random access channel. Only one frequency is selected for transmission in the same time slot. A random access preamble is then transmitted on the selected random access channel in the time slot.

4 Claims, 8 Drawing Sheets

RANDOM ACCESS CHANNEL FREQUENCY DIVERSITY

This application claims priority of U.S. Provisional Application No. 61/021,302 filed on 15 Jan. 2008, the content of which is incorporated herein by reference.

BACKGROUND OF THE INVENTION

1. Field of the Invention

The present invention relates to random access channel (RACH) procedure in a cellular communications network, and in particular to obtaining RACH frequency diversity. While it is described below in the context of a long term evolution (LTE) type cellular network for illustration purposes and because it happens to be well suited to that context, those skilled in the art will recognise that the invention disclosed herein can also be applied to various other types of cellular networks.

2. Discussion of the Related Art

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The LTE of UMTS is under discussion by the 3rd generation partnership project (3GPP) that standardised UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Figure 1:
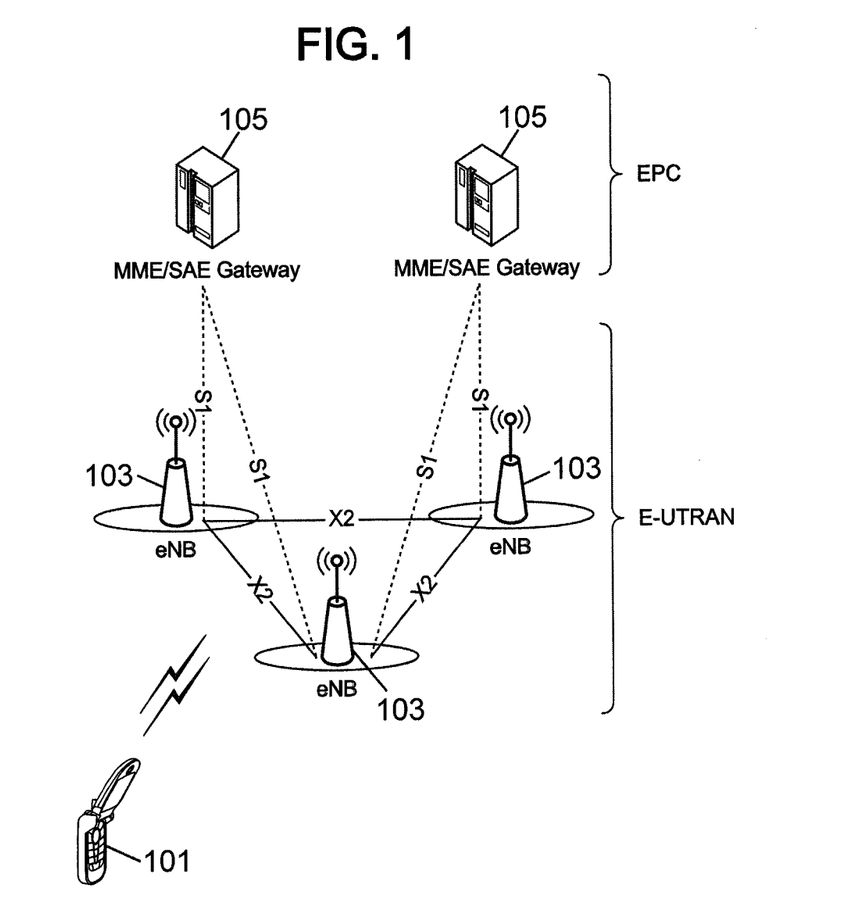
FIG. 1 is a block diagram illustrating network structure of an E-UMTS (or LTE) system.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN) and an evolved packet core (EPC) and one or more user equipments (UEs) 101. The E-UTRAN may include one or more evolved NodeBs (eNodeB, or eNodeB) 103, and a plurality of UEs 101 may be located in one cell. One or more E-UTRAN mobility management entity (MME)/system architecture evolution (SAE) gateways 105 may be positioned at the end of the network and connected to an external network.

As used herein, "downlink" refers to communication from an eNodeB 103 to a UE 101, and "uplink" refers to communication from the UE 101 to an eNodeB 103. UE 101 refers to communication equipment carried by a user and may be also be referred to as a mobile station (MS), a user terminal (UT), a subscriber station (SS) or a wireless device.

An eNodeB 103 provides end points of a user plane and a control plane to the UE 101. MME/SAE gateway 105 provides an end point of a session and mobility management function for UE 101. The eNodeB 103 and the MME/SAE gateway 105 may be connected via an S1 interface.

The eNodeB 103 is generally a fixed station that communicates with a UE 101, and may also be referred to as a base station (BS) or an access point. One eNodeB 103 may be deployed per cell. An interface for transmitting user traffic or control traffic may be used between eNodeBs 103.

The MME provides various functions including distribution of paging messages to eNodeBs 103, security control, idle state mobility control, SAE bearer control, and ciphering and integrity protection of non-access stratum (NAS) signalling. The SAE gateway host provides assorted functions including termination of U-plane packets for paging reasons, and switching of the U-plane to support UE mobility. For clarity, MME/SAE gateway 105 will be referred to herein simply as a "gateway," but it is understood that this entity includes both an MME and an SAE gateway.

A plurality of nodes may be connected between the eNodeB 103 and the gateway 105 via the S1 interface. The eNodeBs 103 may be connected to each other via an X2 interface and neighbouring eNodeBs may have a meshed network structure that has the X2 interface.

Figure 2A:
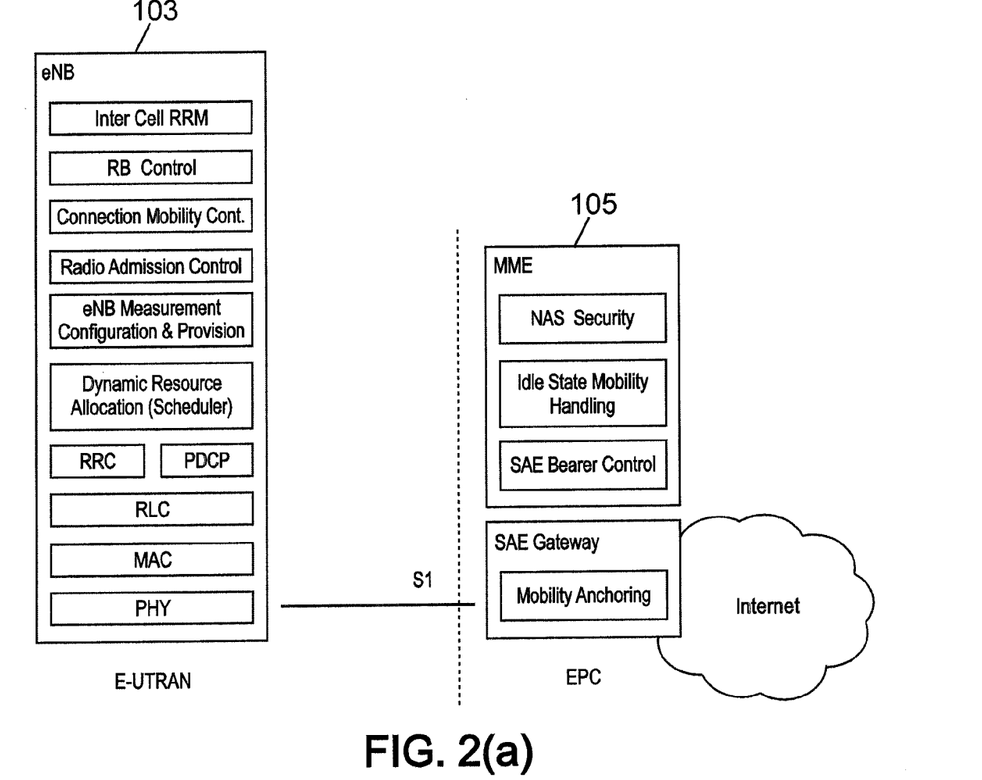
FIGS. 2(a), 2(b) and 2(c) are block diagrams depicting logic architecture of typical network entities of the LTE system (FIG. 2(a)), a user-plane (U-plane) protocol stack (FIG. 2(b)) and a control-plane (C-plane) protocol stack (FIG. 2(c)).

FIG. 2(a) is a block diagram depicting an architecture of a typical E-UTRAN and a typical EPC. As illustrated, eNodeB 103 may perform functions of selection for gateway 105, routing toward the gateway during a radio resource control (RRC) activation, scheduling and transmitting of paging messages, scheduling and transmitting of broadcast channel (BCCH) information, dynamic allocation of resources to UEs 101 in both uplink and downlink, configuration and provisioning of eNodeB measurements, radio bearer control, radio admission control (RAC), and connection mobility control in LTE_ACTIVE state. In the EPC, and as noted above, gateway 105 may perform functions of paging origination, LTE-IDLE state management, ciphering of the user plane, system architecture evolution (SAE) bearer control, and ciphering and integrity protection of non-access stratum (NAS) signalling.

Figure 2B:
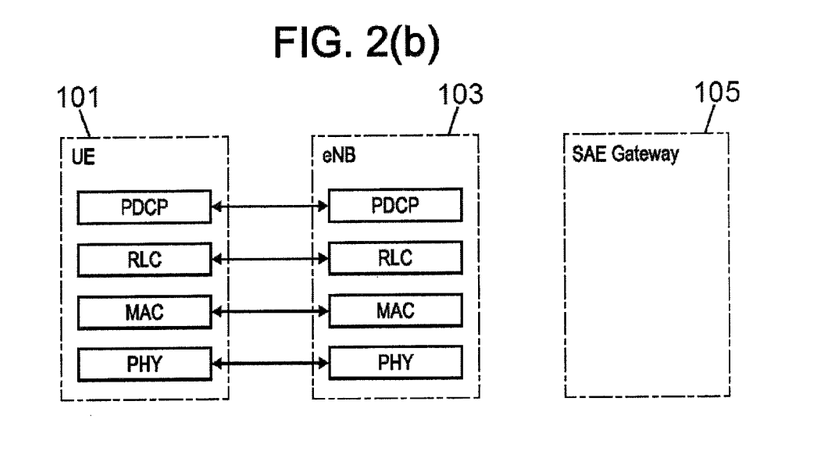
Figure 2C:
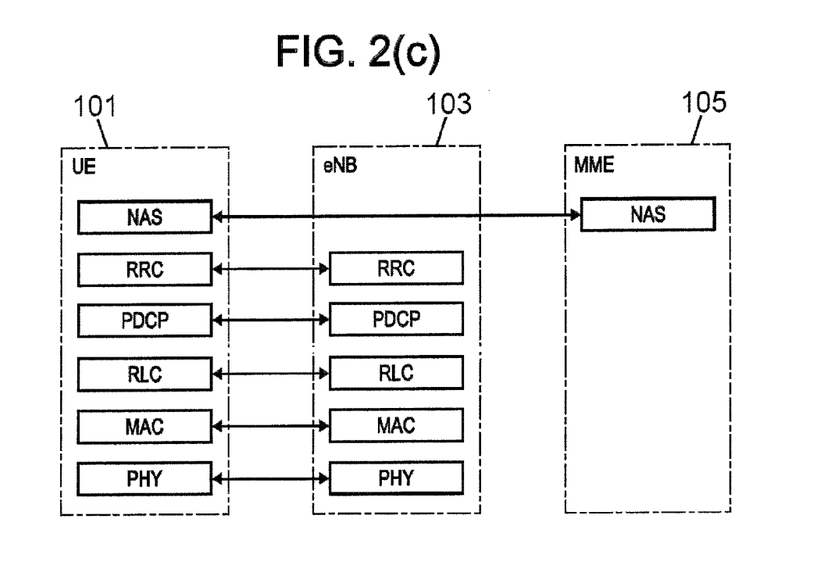

FIGS. 2(b) and 2(c) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The packet data convergence protocol (PDCP) layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 103 on the network side) may perform functions such as scheduling, automatic repeat request (ARQ), and hybrid automatic repeat request (HARQ). The PDCP layer (terminated in eNodeB 103 on the network side) may perform the user plane functions such as header compression, integrity protection, and ciphering.

As illustrated in FIG. 2(c), the RLC and MAC layers (terminated in an eNodeB 103 on the network side) perform the same functions as for the control plane. As illustrated, the RRC layer (terminated in an eNodeB 103 on the network side) may perform functions such as broadcasting, paging, RRC connection management, RB control, mobility functions, and UE measurement reporting and controlling. The NAS control protocol (terminated in the MME of gateway 105 on the network side) may perform functions such as an SAE bearer management, authentication, LTE_IDLE mobility handling, paging origination in LTE_IDLE, and security control for the signalling between the gateway and UE 101.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 101 may receive broadcasts of system information and paging information while the UE 101 specifies a discontinuous reception (DRX) configured by NAS, and the UE has been allocated an identification (ID) which uniquely identifies the UE in a tracking area. Also, in RRC-IDLE state, no RRC context is stored in the eNodeB 103.

In RRC_CONNECTED state, the UE 101 has an E-UTRAN RRC connection and a context in the E-UTRAN, such that transmitting and/or receiving data to/from the network (eNodeB) becomes possible. Also, the UE 101 can report channel quality information and feedback information to the eNodeB 103.

In RRC_CONNECTED state, the E-UTRAN knows the cell to which the UE 101 belongs. Therefore, the network can transmit and/or receive data to/from the UE 101, the network can control mobility (handover) of the UE 101, and the network can perform cell measurements for a neighbouring cell.

In RRC_IDLE mode, the UE 101 specifies the paging discontinuous reception (DRX) cycle. Specifically, the UE 101 monitors a paging signal at a specific paging occasion of every UE specific paging DRX cycle.

The procedure where the UE 101 sends a first message to the network is referred to as initial access. For this the common uplink channel called random access channel is used. In most systems the initial access starts from a UE with the connection request message including the reason of the request, and the answer from the network indicating the allocation of radio resources for the requested reason. Thus, RACH is an uplink common channel used for transmitting control information and user data. It is applied in random access, and used for low-rate data transmissions from the higher layer.

In 3GPP TS 25.331 there are several reasons, called establishment cause, for sending a connection request message. The following are listed: originating conversational/streaming/background/subscribed traffic call, terminating conversational/streaming/interactive/background call, emergency call, inter radio access technology (RAT) cell re-selection, inter-RAT cell change order, registration, detach, originating high/low priority signalling, call re-establishment and terminating high/low priority signalling.

Reason "originating call" means that the UE 101 wants to setup a connection, for instance a speech connection. Reason "terminating call" means that the UE 101 answers to paging. Reason "registration" means that the user wants to register only to location update.

To send the information over the air the physical random access procedure is used. The physical random access transmission is under the control of higher layer protocol which performs some important functions related to priority and load control. These procedures differ in detail but GSM, UMTS and LTE radio systems have some similarities between them.

The UE 101 selects randomly an access resource and transmits a RACH preamble part of a random access procedure to the network. A preamble is a short signal that is sent before the transmission of the RACH connection request message. The UE 101 repeatedly transmits the preamble by increasing the transmission power every time the preamble is sent until it the network indicates the detection of the preamble. Then the message part is sent at the level of power equal to the last preamble transmission power plus an offset signalled by the network.

In E-UMTS (or LTE) radio system it was decided to schedule only one random access frequency region at a time, and to allow frequency hopping (FH) of the physical RACH with FH pattern common to all cells. In addition it was decided on the semi-synchronous transmission timing (i.e. time window), for the random access response after PRACH preamble transmission.

The problem that occurs with time window is its size configuration. Indeed depending on the time window size configuration, it can happen that the UE 101 would not be able to retransmit in the next PRACH occasions which have different frequency region than previous transmission and thus retransmission will happen in the same frequency region than previous transmission, which means no FH between two RACH transmissions leading to performance degradation.

An object of the present invention is to improve the RACH procedure.

SUMMARY OF THE INVENTION

According to a first aspect of the present invention there is provided a method of transmitting on a random access channel in a radio communication system, the method comprising:
    enabling at least two different radio frequencies in a time slot for transmission on the random access channel;
    selecting only one frequency for transmission in the same time slot; and
    transmitting a random access preamble on the random access channel in the time slot by using the selected frequency.

The proposed innovation allows to obtain frequency diversity gain for any time window configuration size, by increasing the current number of random access frequency regions at time to at least two frequency regions.

According to a second aspect of the present invention there is provided a method of receiving on a random access channel in a radio communication system, the method comprising:
    providing at least two different radio frequencies in a time slot for reception on the random access channel;
    monitoring the at least two different radio frequencies for reception in the same time slot; and receiving a random access preamble on the monitored radio access channel in the time slot.

According to a third aspect of the present invention there is provided a user equipment for transmitting on a random access channel in a wireless radio communication network, the user equipment being arranged for selecting only one frequency for transmission in a time slot, wherein at least two different radio frequencies are available in the same time slot for transmission on the random access channel, and arranged for transmitting a random access preamble on the selected radio access channel frequency in the time slot.

According to a fourth aspect of the present invention there is provided a network element for receiving on a random access channel, the network element being arranged for monitoring at least two different radio frequencies for reception in a time slot, wherein at least two different radio frequencies are available in the same time slot for reception on the random access channel, and arranged for receiving a random access preamble on the monitored random access channel frequency in the time slot.

BRIEF DESCRIPTION THE DRAWINGS

Other objects, features and advantages of the invention will become apparent when reading the following description on non-limiting exemplary embodiments with reference to the accompanying drawings.

DESCRIPTION OF PREFERRED EMBODIMENTS

An embodiment of the present invention is next described in more detail with reference to the attached figures. This embodiment is described in the context of LTE, but the invention is by no means limited to this environment.

In LTE the random access procedure is classified into two categories: non-synchronised random access and synchronised random access. Only non-synchronised random access is considered in the following.

Figure 3:
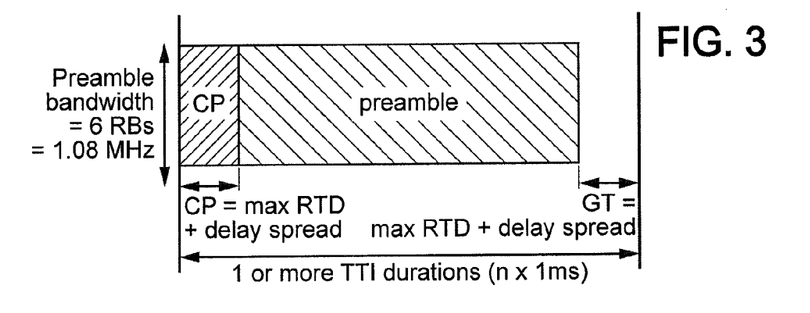
FIG. 3 shows a RACH preamble structure in E-UMTS.

The non-synchronised access is used when the uplink connection of the UE 101 is not time synchronised or when the UE 101 loses uplink synchronisation. The non-synchronised access allows the network to estimate and, if needed, to adjust the UE 101 transmission timing. Therefore, the non-synchronised random access preamble is at least used for time alignment and signature detection. The physical layer random access burst as shown in FIG. 3 consists of a cyclic prefix, a preamble, and a guard time during which nothing is transmitted. In that figure, CP denotes cyclic prefix, GT denotes guard time, RTD denotes round trip delay and TTI denotes transmission time interval.

The random access preambles are generated from Zadoff-Chu sequences with zero correlation zone (ZC-ZCZ) generated from one or several root Zadoff-Chu sequences to achieve good detection probability. The random access preamble carries six bits containing implicitly transmitted pieces of information broadcast on system information. Alternatively these pieces of information can also be fixed in the standard specification and in this case there is no need to broadcast that information to the UE 101.

These pieces of implicit information may comprise any additional associated signalling information, e.g. a random ID, pathloss/channel quality indicator (CQI), access purpose, and so forth.

The UE 101 randomly selects a signature out of a group of signatures to distinguish between different UEs that attempt an access simultaneously. The preamble shall have good auto-correlation properties in order for the eNodeB 103 to obtain an accurate timing estimate. In addition, the different preambles should have good cross-correlation properties in order for the eNodeB 103 to distinguish between simultaneous access attempts for different UEs using different signatures.

Prior to initiation of the non-synchronised physical random access procedure, Layer 1 shall receive the following information from the higher layers:
 Available random access channels (number, frequency position, time period and timing offset);
 Available preamble formats and their mapping to pieces of implicit information;
 Available Zadoff-Chu (ZC) root sequences and indices;
 Initial preamble transmission power;
 Power ramping step size (0 dB step size is allowed); and
 Maximum number of preamble retransmissions.

Figure 4:
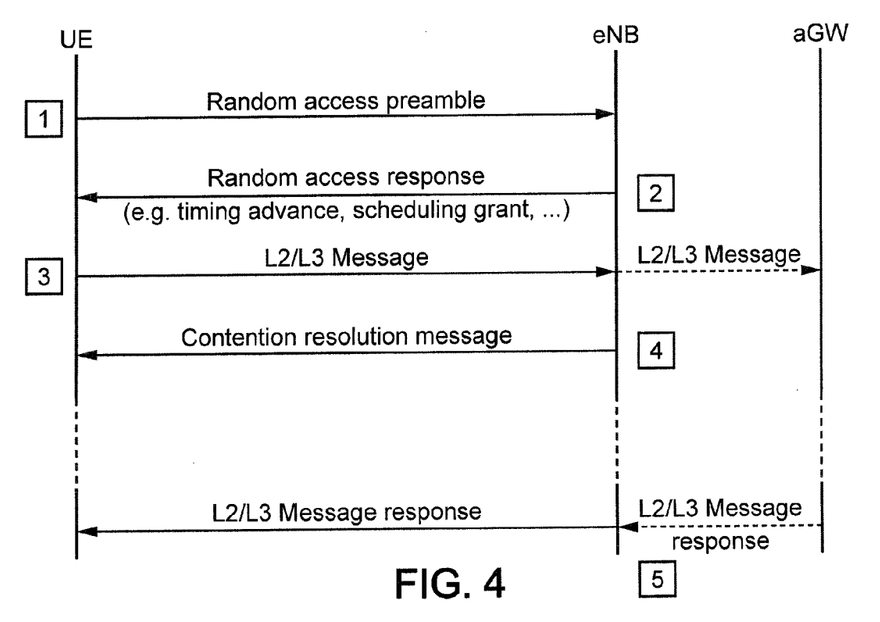
FIG. 4 is a diagram illustrating the RACH procedure in E-UMTS.

From the physical layer perspective, the L1 random access procedure encompasses successful transmission of messages 1 and 2, i.e. random access preamble and random access response, respectively, as shown in FIG. 4. The remaining messages are scheduled for transmission by the higher layer on a shared data channel and thus not considered part of L1 random access procedure. FIG. 4 illustrates the call flow diagram for the non-synchronised random access procedure. A random access channel is a 1.08 MHz portion of a subframe or set of consecutive subframes reserved for random access preamble transmissions.

The following steps are required for the L1 random access procedure:

1. Prior to initiation of the non-synchronised physical random-access procedure, Layer 1 shall receive the information indicated above from the higher layers.

2. A random access channel is randomly selected from the available non-synchronised random access channels. A preamble sequence is then randomly selected from the available preamble set based on the implicit message to be transmitted. The random function shall be such that each of the allowed selections is chosen with equal probability.

3. The initial preamble transmission power level (which is set by the MAC) is determined using an open loop power control procedure. The transmission counter is set to the maximum number of preamble retransmissions. Preamble transmission then occurs using the selected random access channel, preamble sequence, and preamble transmission power.

4. If no response (message 2) corresponding to the transmitted preamble sequence (message 1) is detected then another random access channel and preamble are randomly selected. If the maximum transmission power and the maximum number of retransmissions have not been reached, then preamble retransmission occurs. Otherwise the L1 status ("No acknowledgment on non-synchronised random access") is passed to the higher layers (MAC) and the physical random access procedure is exited.

5. If a response (message 2) corresponding to the transmitted preamble sequence (message 1) is detected, then the L1 status ("ACK on non-synchronised random access received") is passed to the higher layers (MAC) and the physical random access procedure is exited.

Figure 5:
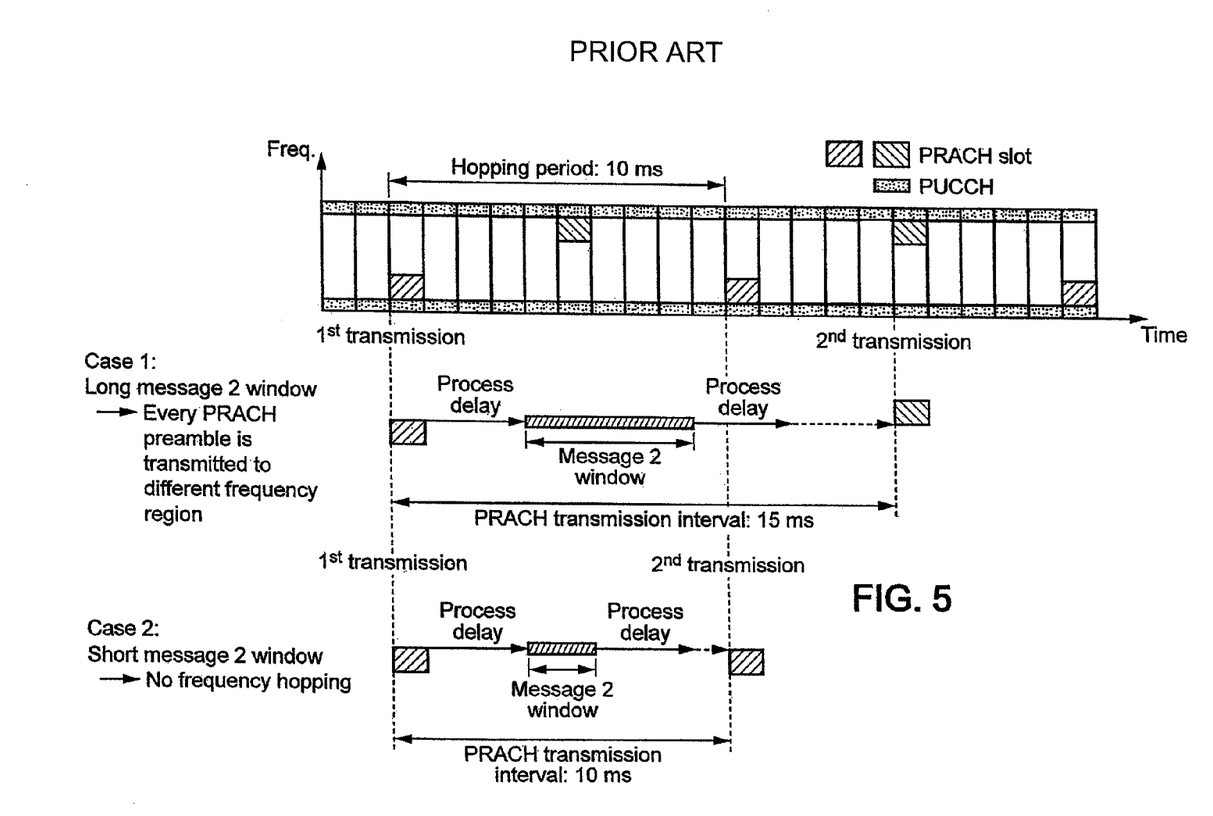
FIG. 5 illustrates an example of a prior art RACH frequency hopping method.

Previous art considers only 1 random access frequency region at a time as illustrated in FIG. 5. Then depending on the time window configuration size for the message 2 (message 2 being the random access response after PRACH preamble transmission, i.e. message 1), the RACH may not benefit from frequency diversity gain. In other words, if the message 2 time window length is inappropriate, this leads to the loss of frequency diversity gain.

As can be seen in FIG. 5, in case of a long message 2 time window, frequency gain diversity is achieved, whereas in case of a short message 2 window, frequency diversity gain cannot be obtained, since frequency hopping is not possible. In this case all the RACH preambles are sent on the same frequency. It is to be noted that during the "process delay" information is processed, and no messages can be sent. The message 2 window length is indicated by the network and can change over time. In case of a long message 2 window, the PRACH preamble transmission interval is 15 ms in the present example, whereas in case of a short message 2 time window, the PRACH transmission interval is 10 ms.

The present invention proposes two random access frequency regions at a time in order to get frequency diversity gain for any time window size that can be configured for message 2 in RACH procedure. This solution is illustrated in FIG. 6.

Figure 6:
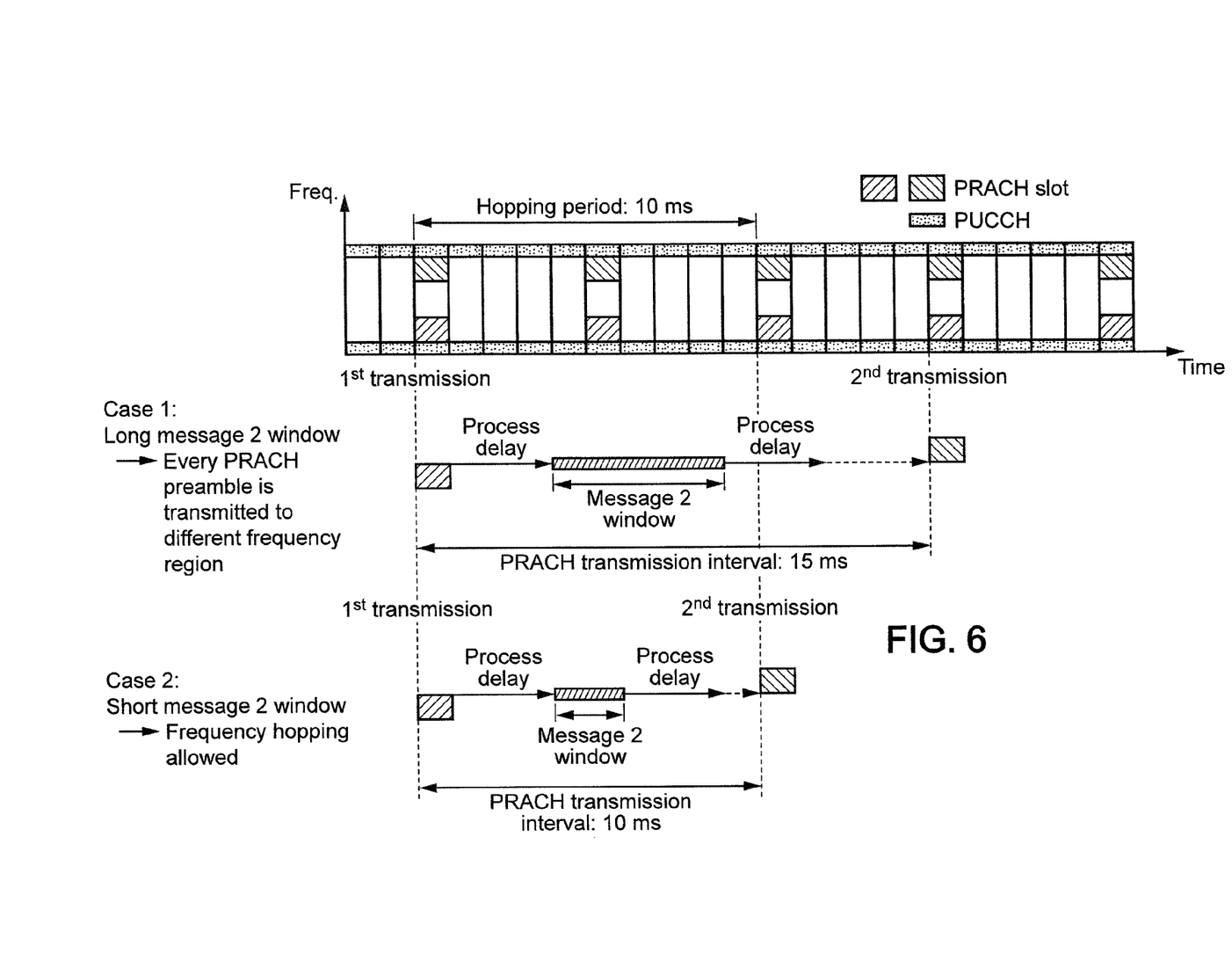
FIG. 6 illustrates the RACH frequency hopping method according to an embodiment of the present invention.

As illustrated in FIG. 6, the network needs to configure two random access frequency regions at time, i.e. in a single time slot. The time window size is configurable and can be cell size dependent, preamble format dependant or/and PRACH access slot configuration dependent. The network either informs the UE 101 about the time window size or the time window size is determined by the UE 101 in function of the cell size or PRACH access slot configuration.

In accordance with an embodiment of the present invention, the UE 101 chooses randomly for the first transmission the PRACH frequency region that will be used for transmission. The next retransmissions shall occur in the opposite PRACH frequency region to the previous transmission. In this example the random access frequencies are located next to physical uplink control channel (PUCCH) frequencies as also shown in FIG. 6. In other words, control channel frequencies are located at the edges of the available bandwidth (up and down). The region between up and down control channels are used for data transmission, in this example on physical uplink shared channel (PUSCH). This provides the benefit that the segmentation of the data region can be avoided. Another benefit is larger frequency diversity gain as distance between hopping frequencies is bigger.

Figure 7:
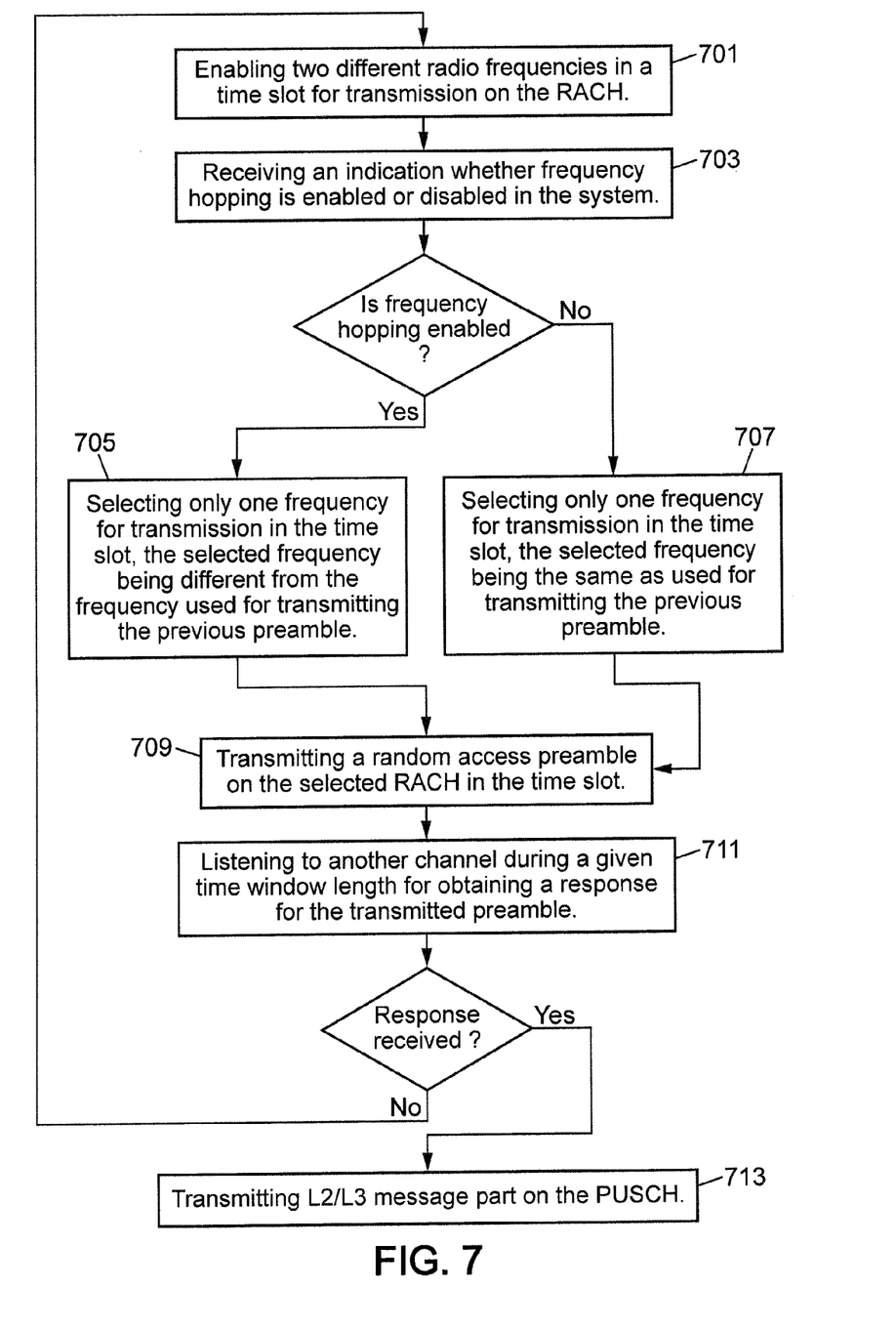
FIG. 7 is a flow chart illustrating a method of transmitting a RACH preamble in accordance with an embodiment of the present invention.

FIG. 7 shows a flow chart depicting an embodiment of the present invention. In step 701 at least two different RACH frequencies are enabled in a single time slot. In step 703 an indication is received from the network whether the network supports frequency hopping or not. If the frequency hopping is supported by the network, then in step 705 only one RACH frequency is selected for transmission of the preamble in the time slot. The selected frequency is different from the frequency used for transmitting the previous preamble, if previously a preamble was transmitted. The network can indicate to the UE 101 which RACH frequency it should use or if such an indication is not received, the UE 101 can choose the frequency randomly from the available frequencies. If on the other hand frequency hopping is not supported by the network, then again only one RACH frequency is selected in step 707, but now the selected frequency is the same frequency as used in the transmission of the previous preamble, if previously a preamble was transmitted.

Then after steps 705 and 707 a random access preamble is transmitted in step 709 in the time slot by the UE 101 to the network. In step 711 the UE 101 listens to another frequency during a given time window length for obtaining a response for the transmitted preamble. If a response is received from the network, then in step 713 an L2/L3 message part is transmitted by the UE 101 to the network on the PUSCH. If on the other hand no response was received then another preamble will be sent, if the allowable number of preamble retransmission is not exceeded.

Figure 8:
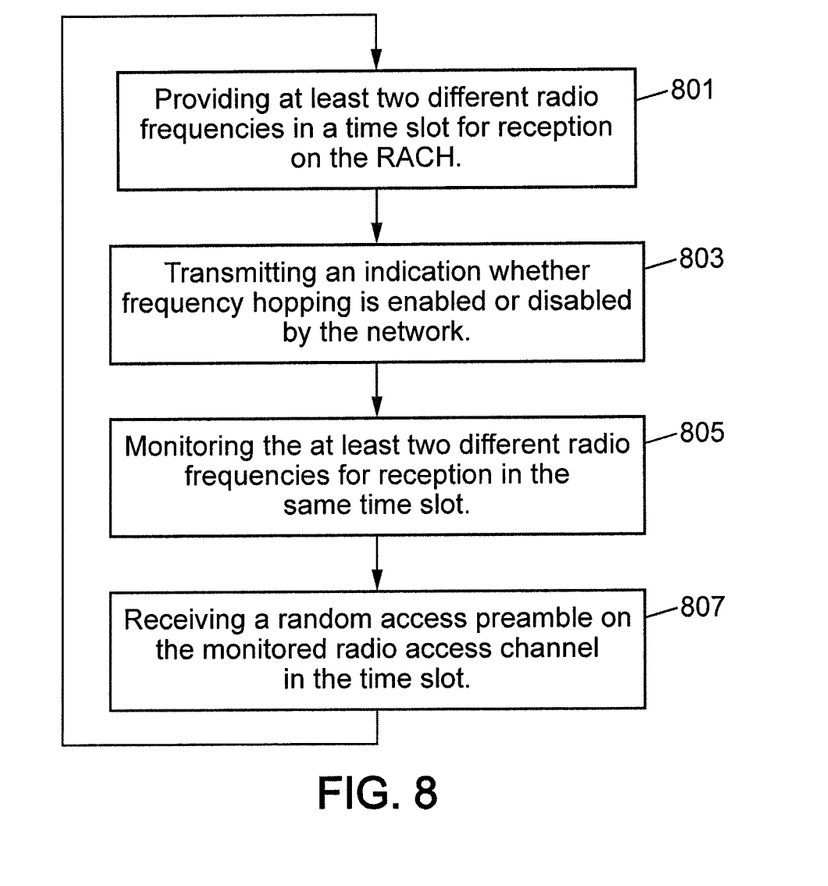
FIG. 8 is a flow chart illustrating a method of receiving a RACH preamble in accordance with an embodiment of the present invention.

The flow chart of FIG. 8 illustrates the method of the eNodeB 103 receiving a random access preamble. In step 801 at least two different radio frequencies are provided in a time slot for reception on the RACH. In step 803 an indication is transmitted whether frequency hopping is enabled or disabled by the network. In step 805 the at least two different radio frequencies are monitored for reception in the same time slot. Finally in step 807 a random access preamble is received on the monitored radio access channel in the time slot. It is to be noted that step 803 could be also performed at another stage in the process.

An embodiment of the present invention has been disclosed above in the illustrative case of a 3GPP LTE system. Those skilled in the wireless communication art will appreciate that various modifications can be brought to this embodiment without departing from the invention and from the attached claims. They will also appreciate that the invention is applicable to communications systems other than 3GPP LTE systems.

The invention claimed is:

1. A method of performing a random access procedure on a random access channel by a user equipment in a radio communication system, the method comprising:

enabling two different radio frequency regions in a plurality of time slots for transmission of random access preambles on the random access channel, wherein the two different radio frequency regions are located at edges of an available bandwidth in each time slot of the plurality of time slots, and wherein a data region to be used for data transmission is located between the two different radio frequency regions in each time slot;

receiving an indication from a network, the indication indicating whether frequency hopping is enabled for a time window of the random access channel;

selecting a frequency region among the two different frequency regions for transmission of a random access preamble in a same time slot;

transmitting the random access preamble to the network on the random access channel in the same time slot using the selected frequency region;

listening to another channel during a given length of the time window to obtain a response to the transmitted preamble, wherein the length of the time window is configurable by the radio communication system;

if the indication indicates that the frequency hopping is enabled, alternately transmitting the random access preambles via the two different radio frequency regions in the plurality of time slots; and if the indication indicates that the frequency hopping is not enabled, transmitting the random access preambles via only one of the two different radio frequency regions in the plurality of time slots.

2. The method according to claim 1, wherein the length of the time window is dependent on at least one of:
a preamble format,
a cell size, and
a random access channel configuration.

3. A user equipment for performing a random access procedure on a random access channel in a wireless radio communication network, wherein a protocol layer of the user equipment comprises a physical layer, the user equipment being configured to: enable two different radio frequency regions in a plurality of time slots for transmission of random access preambles on the random access channel, wherein the two different radio frequency regions are located at edges of an available bandwidth in each time slot of the plurality of time slots, and wherein a data region to be used for data transmission is located between the two different radio frequency regions in each time slot; receive an indication from a network, the indication indicating whether frequency hopping is enabled for a time window of the random access channel; select a frequency region among the two different frequency regions for transmission of a random access preamble in a same time slot; transmit the random access preamble to the network on the random access channel in the same time slot using the selected frequency region; listen to another channel during a given length of the time window to obtain a response to the transmitted preamble, wherein the length of the time window is configurable by the user equipment, if the indication indicates that the frequency hopping is enabled, alternately transmit the random access preambles via the two different radio frequency regions in the plurality of time slots; and if the indication indicates that the frequency hopping is not enabled, transmit the random access preambles via only one of the two different radio frequency regions in the plurality of time slots.

4. The user equipment of claim 3, wherein the length of the time window is dependent on at least one of:
a preamble format,
a cell size, and
a random access channel configuration.

* * * * *